(12) United States Patent
Worsley

(10) Patent No.: US 10,428,472 B1
(45) Date of Patent: Oct. 1, 2019

(54) METHOD OF CONTROLLING A CROSS SLOPE OF AN ASPHALT PAVER SCREED

(71) Applicant: Caterpillar Trimble Control Technologies LLC, Dayton, OH (US)

(72) Inventor: Andrew James Worsley, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

(21) Appl. No.: 16/164,284

(22) Filed: Oct. 18, 2018

(51) Int. Cl.
| | | |
|---|---|---|
| *E01C 19/08* | (2006.01) | |
| *E01C 23/07* | (2006.01) | |
| *E01C 19/48* | (2006.01) | |
| *E01C 23/01* | (2006.01) | |
| *E01C 19/00* | (2006.01) | |
| *A01B 63/24* | (2006.01) | |
| *A01B 63/28* | (2006.01) | |

(52) U.S. Cl.
CPC .............. *E01C 19/48* (2013.01); *A01B 63/24* (2013.01); *A01B 63/28* (2013.01); *E01C 19/006* (2013.01); *E01C 19/08* (2013.01); *E01C 23/01* (2013.01); *E01C 23/07* (2013.01); *E01C 2301/14* (2013.01)

(58) Field of Classification Search
CPC ........ E01C 19/08; E01C 19/004; E01C 19/00; E01C 23/07; E01C 19/006; A01B 15/14; A01B 63/22; A01B 51/04; A01B 63/04; A01B 63/14; A01C 7/208; E02F 13/841
USPC .......... 701/50; 172/669, 675; 404/84.1, 84.8
See application file for complete search history.

(56) References Cited

U.S. PATENT DOCUMENTS

| | | | | |
|---|---|---|---|---|
| 3,285,148 | A | 11/1966 | Munyon | |
| 4,413,685 | A * | 11/1983 | Gremelspacher | ...... A01B 63/22 111/14 |
| 8,068,962 | B2 * | 11/2011 | Colvard | ............... E01C 19/006 404/84.05 |
| 8,453,754 | B2 * | 6/2013 | Beaujot | .................. A01B 63/16 172/2 |
| 8,668,024 | B2 * | 3/2014 | Beaujot | .................. A01B 63/16 172/2 |
| 8,930,092 | B2 * | 1/2015 | Minich | ................... E01C 23/07 701/50 |

(Continued)

FOREIGN PATENT DOCUMENTS

| | | | | |
|---|---|---|---|---|
| CA | 2839238 A1 * | 7/2014 | ............... | A01B 5/04 |
| EP | 2759187 B1 * | 1/2016 | ............... | A01B 5/04 |

(Continued)

*Primary Examiner* — Cuong H Nguyen
(74) *Attorney, Agent, or Firm* — Kilpatrick Townsend & Stockton

(57) ABSTRACT

Systems and methods for controlling the cross slope of an asphalt paver screed. One system includes a tractor and an implement coupled to the tractor via a left tow arm and a right tow arm. The system also includes a left slope sensor mounted to the left tow arm and a right slope sensor mounted to the right tow arm. The system further includes one or more processors configured to perform operations including receiving left slope data and right slope data, calculating a measured cross slope of a virtual transverse beam extending between the left tow arm and the right tow arm based on the left slope data and the right slope data, obtaining a target cross slope, and causing movement of one or both of the left tow arm and the right tow arm based on a comparison between the measured cross slope and the target cross slope.

20 Claims, 12 Drawing Sheets

(56) References Cited

U.S. PATENT DOCUMENTS

| | | | | |
|---|---|---|---|---|
| 8,985,232 | B2* | 3/2015 | Bassett | A01C 7/205 |
| | | | | 111/135 |
| 9,026,321 | B2* | 5/2015 | Henry | A01B 79/005 |
| | | | | 701/50 |
| 9,084,390 | B2* | 7/2015 | Audigie | A01B 63/22 |
| 2009/0101371 | A1* | 4/2009 | Melanson | A01B 69/004 |
| | | | | 172/6 |
| 2013/0245898 | A1* | 9/2013 | Beaujot | A01B 63/16 |
| | | | | 701/50 |
| 2014/0209335 | A1* | 7/2014 | Casper | A01B 5/04 |
| | | | | 172/260.5 |
| 2014/0311391 | A1* | 10/2014 | Audigie | A01B 63/22 |
| | | | | 111/70 |
| 2015/0012189 | A1* | 1/2015 | Henry | A01B 79/005 |
| | | | | 701/50 |
| 2015/0305224 | A1* | 10/2015 | Casper | H04N 7/183 |
| | | | | 701/50 |
| 2016/0088787 | A1* | 3/2016 | Connell | A01B 76/00 |
| | | | | 701/50 |
| 2017/0034990 | A1* | 2/2017 | Casper | A01B 5/04 |
| 2018/0206393 | A1* | 7/2018 | Stoller | A01B 49/06 |

FOREIGN PATENT DOCUMENTS

| | | | | |
|---|---|---|---|---|
| EP | 2936957 | B1* | 8/2017 | A01B 63/28 |
| EP | 3011815 | B1* | 8/2017 | A01B 63/112 |
| WO | WO-2017049186 | A1* | 3/2017 | A01B 49/06 |

* cited by examiner

METHOD OF CONTROLLING A CROSS SLOPE OF AN ASPHALT PAVER SCREED

BACKGROUND

Modern construction machines have dramatically increased the efficiency of performing various construction projects. For example, earthmoving machines employing automatic slope control systems are able to grade a project area using fewer passes than what was previously done manually. As another example, modern asphalt pavers and other road makers have allowed replacement of old roads and construction of new roads to occur on the order of hours and days instead of what once took place over weeks and months. Construction crews also now comprise fewer individuals due to the automation of various aspects of the construction process. Much of the technological advances of construction machines are owed in part to the availability of accurate sensors that allow real-time monitoring of the condition and position of a machine's components and/or the environment surrounding the machine. Despite the improvements in modern construction machines, new systems, methods, and techniques are still needed.

SUMMARY

In a first aspect of the present invention, a construction machine is provided. The construction machine may include a tractor. The construction machine may also include an implement coupled to the tractor via a left tow arm and a right tow arm. The construction machine may further include a left slope sensor mounted to the left tow arm. The construction machine may further include a right slope sensor mounted to the right tow arm. The construction machine may further include one or more processors configured to perform operations including receiving, from the left slope sensor, left slope data. The operations may also include receiving, from the right slope sensor, right slope data. The operations may further include calculating a measured cross slope of a virtual transverse beam extending between the left tow arm and the right tow arm based on the left slope data and the right slope data. The operations may further include obtaining a target cross slope. The operations may further include causing movement of one or both of the left tow arm and the right tow arm based on a comparison between the measured cross slope and the target cross slope.

In some embodiments, the construction machine is an asphalt paver. In some embodiments, the implement is a screed. In some embodiments, the comparison between the measured cross slope and the target cross slope is performed by a slope controller that calculates an error between the measured cross slope and the target cross slope. In some embodiments, causing movement of the one or both of the left tow arm and the right tow arm is based on the error. In some embodiments, the left slope data includes a left roll angle detected by the left slope sensor and a left pitch angle detected by the left slope sensor. In some embodiments, the right slope data includes a right roll angle detected by the right slope sensor and a right pitch angle detected by the right slope sensor. In some embodiments, calculating a measured cross slope includes calculating a gravity-based component based on the left roll angle and the right roll angle, calculating a lift-based component based on the left pitch angle and the right pitch angle, and calculating the measured cross slope by summing the gravity-based component and the lift-based component. In some embodiments, causing movement of the one or both of the left tow arm and the right tow arm based on the comparison includes generating and sending a control signal to one or both of a left tow point cylinder coupled to the left tow arm and a right tow point cylinder coupled to the right tow arm. In some embodiments, the left tow arm is coupled to the left tow point cylinder at a forward end of the left tow arm and to the implement at a rear end of the left tow arm and the right tow arm is coupled to the right tow point cylinder at a forward end of the right tow arm and to the implement at a rear end of the right tow arm.

In a second aspect of the present invention, a machine control system is provided. The machine control system may include a left slope sensor mounted to a left tow arm of a construction machine. In some embodiments, the construction machine includes a tractor and an implement coupled to the tractor via the left tow arm and a right tow arm. The machine control system may further include a right slope sensor mounted to the right tow arm. The machine control system may further include one or more processors configured to perform operations including receiving, from the left slope sensor, left slope data. The operations may also include receiving, from the right slope sensor, right slope data. The operations may further include calculating a measured cross slope of a virtual transverse beam extending between the left tow arm and the right tow arm based on the left slope data and the right slope data. The operations may further include obtaining a target cross slope. The operations may further include causing movement of one or both of the left tow arm and the right tow arm based on a comparison between the measured cross slope and the target cross slope.

In a third aspect of the present invention, a method is provided. The method may include receiving left slope data from a left slope sensor. In some embodiments, the left slope sensor is mounted to a left tow arm of a construction machine. In some embodiments, the construction machine includes a tractor and an implement coupled to the tractor via the left tow arm and a right tow arm. The method may also include receiving right slope data from the right slope sensor. In some embodiments, the right slope sensor is mounted to the right tow arm. The method may further include calculating a measured cross slope of a virtual transverse beam extending between the left tow arm and the right tow arm based on the left slope data and the right slope data. The method may further include obtaining a target cross slope. The method may further include causing movement of one or both of the left tow arm and the right tow arm based on a comparison between the measured cross slope and the target cross slope.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present invention relate to systems, methods, and other techniques for controlling the cross slope of an asphalt paver screed. In some embodiments, a machine control system is implemented in an asphalt paver that includes left and right slope sensors mounted to left and right tow arms and a control box that receives slope information from the slope sensors. Based on the slope data and a few basic geometrical measurements of the screed assembly, the control box calculates a measured cross slope of a virtual transverse beam extending between the tow arms. Placing an slope sensor on an actual transverse beam would expose the sensor to high temperatures and severe vibration effects, and would limit the flexibility of the asphalt paver's design by requiring the transverse beam. According to some embodiments, once calculated, the measured cross slope is compared to a target cross slope inputted by a user. Based on the comparison, one or both of the tow arms are caused to move so that the measured and target cross slopes converge and reach steady state values, thereby allowing control of the actual cross slope of the screed in accordance with the user input.

Figure 1:
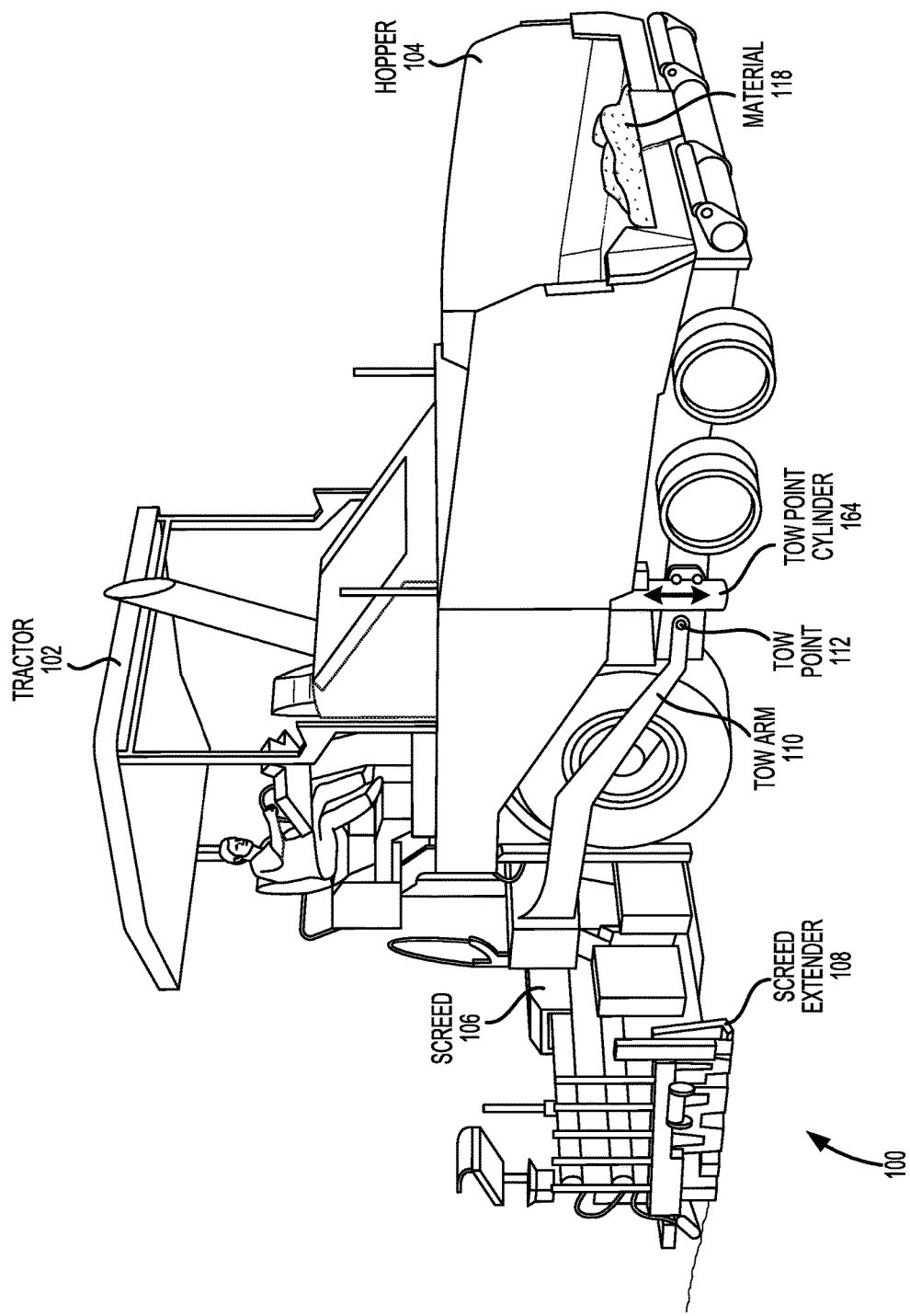
FIG. 1 illustrates a perspective view of an asphalt paver, according to some embodiments of the present invention.

FIG. 1 illustrates a perspective view of an asphalt paver 100, according to some embodiments of the present invention. Asphalt paver 100 is a type of construction machine used to lay asphalt on roads, bridges, parking surfaces, and the like. The term "construction machine" as used herein may refer to asphalt paver 100 or to any one of a number of different types of construction machines, including pavers (e.g., concrete, asphalt, slipform, vibratory, etc.), graders, compactors, excavators, scrapers, loaders, etc., each of which may have components similar to those described in reference to asphalt paver 100.

Asphalt paver 100 may include a tractor 102 with wheels, axles, tracks, and/or a gasoline-, diesel-, electric-, or steam-powered engine for providing power and traction to asphalt paver 100 to drive along a desired path, often at a constant speed. Tractor 102 may include a cab where one or more operators of asphalt paver 100 may control the construction machine using various input devices such as computers, levers, switches, buttons, pedals, etc. Input devices may alternatively or additionally be located at other locations throughout asphalt paver 100. Asphalt paver 100 may include a hopper 104 mechanically coupled to (or integrated with) tractor 102. A material 118 to be laid (e.g., asphalt) may be added to hopper 104 by a dump truck or a material transfer device while asphalt paver 100 is stationary or during operation of asphalt paver 100, such that material 118 may be added to hopper 104 concurrently with moving and laying material 118.

Asphalt paver 100 may include a screed 106 that is mechanically coupled to tractor 102 via one or more tow arms 110. The term "implement" as used herein may refer to screed 106 or to any one of a number of different types of implements that may be dragged behind or pushed in front of a construction machine. Screed 106 may receive material 118 from hopper 104 and spread it over the width of screed 106. The material may pass through an auger which places it in front of the middle of screed 106. In some embodiments, it is desirable to provide a smooth uniform surface of asphalt behind screed 106 which may be achieved by causing screed 106 to pass over the asphalt and be raised above the ground. Using tow arms 110 controlled by tow point cylinders 164, a cross slope associated with screed 106 (i.e., the angle formed by screed 106 with respect to the transverse direction) may be adjusted by a control system to improve the smoothness of the laid asphalt.

The width of screed 106 may be adjusted by moving (e.g., extending or retracting) a screed extender 108, which may be included on a single side or both sides of screed 106. Screed extender 108 may be extended or retracted from screed 106 in the transverse direction, independent of whether asphalt paver 100 is moving forward. When equipped on both sides of screed 106, screed extenders 108 may double the effective width of screed 106, increasing the efficiency of a paving operation. Movement of screed extender 108 is caused by one or more extender actuators positioned within screed 106. In one particular implementation, an extender actuator may be a hydraulic cylinder. In other embodiments, or in the same embodiments, an extender actuator may comprise any type of hydraulic, pneumatic, electric, magnetic, and/or mechanical actuator. Screed extender 108 may be moved while asphalt paver 100 is stationary, driving forward, accelerating, and/or turning.

The height and cross slope of screed 106 may be adjusted by moving tow arms 110. In some embodiments, movement of tow arms 110 is caused by vertical movement of one or more tow point cylinders 164 coupled to tow arms 110 at tow points 112. In the illustrated embodiment, tow point cylinders 164 are rigidly connected to tow points 112 and tow arms 110 may pivot about tow points 112 such that upward (or downward) vertical movement of tow point cylinders 164 causes upward (or downward) vertical movement of the forward end of tow arms 110 and rotational movement of tow arms 110. Alternatively or additionally, tow point cylinders 164 may pivot about tow points 112 and tow arms 110 may be rigidly connected to tow points 112 such that upward (or downward) vertical movement of tow point cylinders 164 causes upward (or downward) vertical movement of the forward end of tow arms 110 and rotational movement of tow arms 110. In one particular implementation, tow point cylinders 164 may be hydraulic cylinders. In other embodiments, or in the same embodiments, tow point cylinders 164 may comprise any type of hydraulic, pneumatic, electric, magnetic, and/or mechanical actuators.

Figure 2:
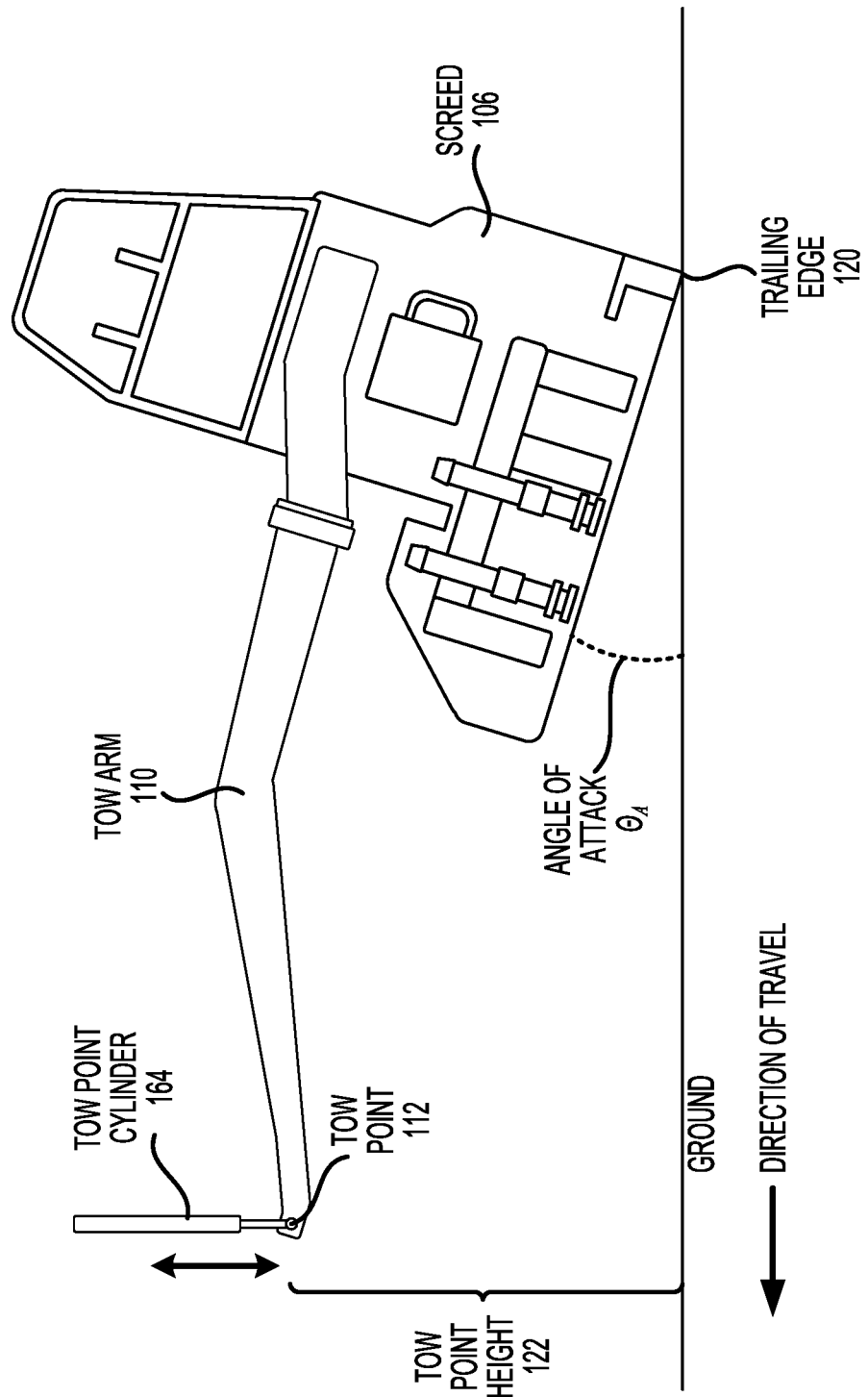
FIG. 2 illustrates a basic functionality of an asphalt paver, according to some embodiments of the present invention.

FIG. 2 illustrates a basic functionality of asphalt paver 100, according to some embodiments of the present invention. As illustrated, screed 106 may be dragged behind asphalt paver 100 with respect to a direction of travel such that a trailing edge 120 of screed 106 is in physical contact with the ground when material 118 is not being laid. During operation, asphalt paver 100 may vertically raise or lower tow point cylinder 164 so as to set a tow point height 122 defined as the vertical distance between tow point 112 and the ground, and an angle of attack $\theta_A$ defined as the angle formed by the bottom side of screed 106 and the ground. Although a single side of asphalt paver 100 is illustrated in FIG. 2, asphalt paver 100 may include two tow point cylinders 164, two tow points 112, and two tow arms 110, one on each side of asphalt paver 100 (left and right), which may be adjusted by movement of tow point cylinders 164 to set two tow point heights 122 and two angles of attack $\theta_A$.

When asphalt paver 100 is stationary, trailing edge 120 remains in contact with the ground and represents the "hinge" line about which any change in tow point height 122 causes screed 106 to rotate, thus changing the angle of attack $\theta_A$ relative to the ground surface. Without material 118 in front of screed 106, screed 106 behaves in much the same way as it travels over flat ground, since trailing edge 120 remains on the ground while the angle of attack $\theta_A$ changes as tow points 112 are raised or lowered.

Figure 3:
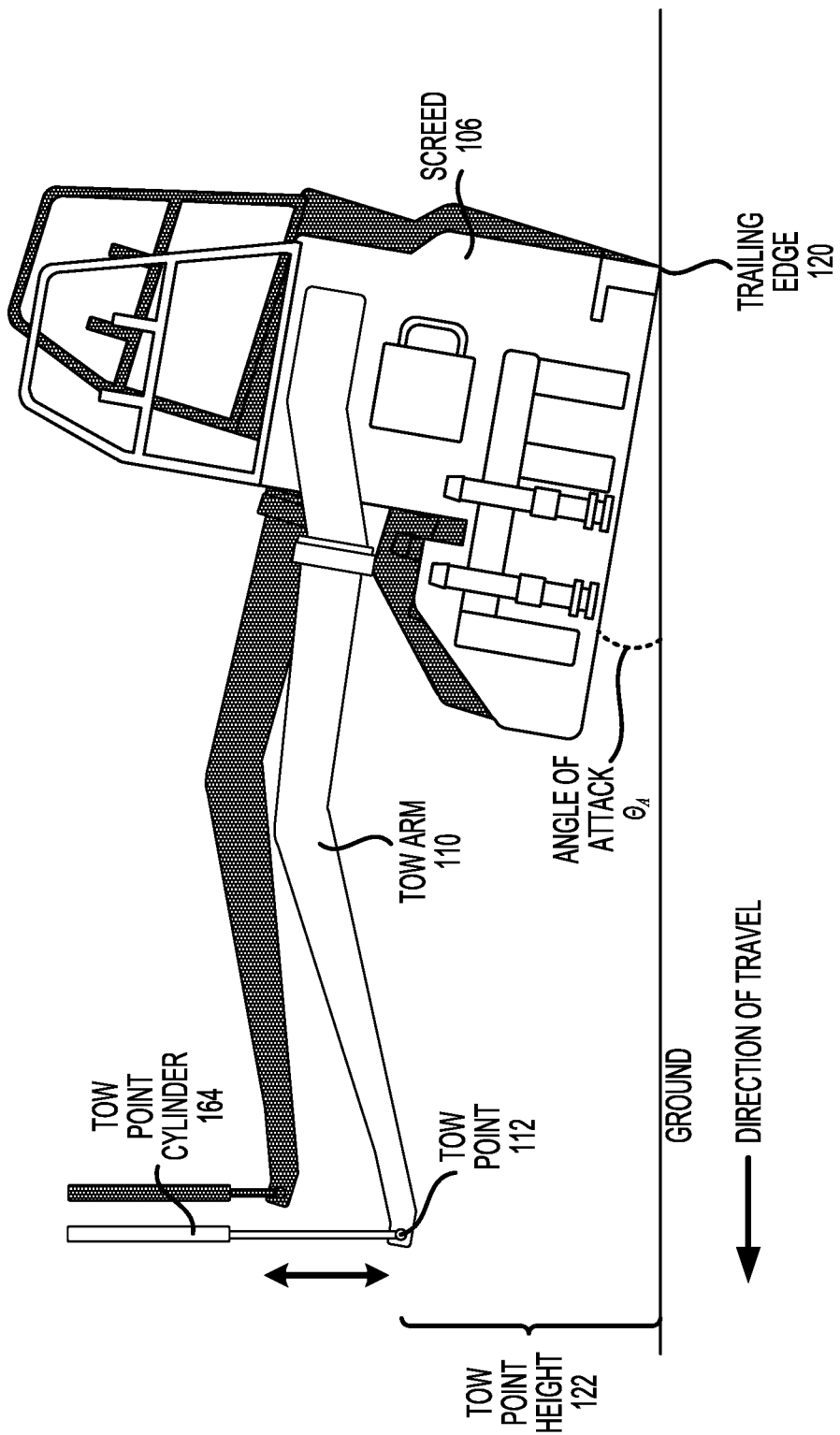
FIG. 3 illustrates a scenario in which a tow point cylinder is lowered, according to some embodiments of the present invention.

FIG. 3 illustrates a scenario in which tow point cylinder 164 is lowered thereby causing both tow point height 122 and the angle of attack $\theta_A$ to decrease. A silhouette of the scenario described in FIG. 2 is also illustrated for comparison, with the two scenarios aligned at trailing edge 120 for illustrative purposes.

Figure 4:
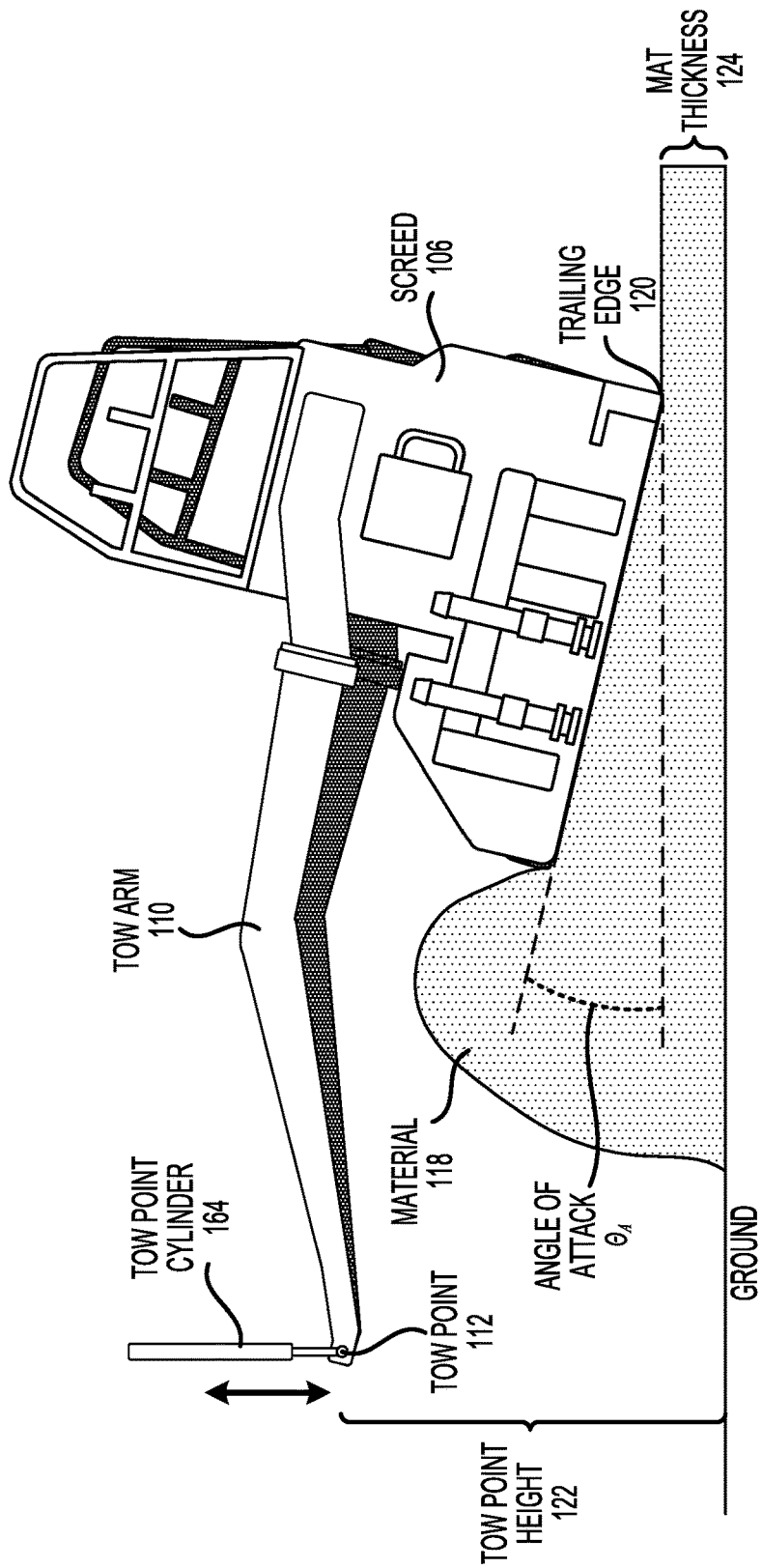
FIG. 4 illustrates a scenario in which a tow point cylinder remains at a constant height and material is introduced in front of a screed, according to some embodiments of the present invention.

FIG. 4 illustrates a scenario in which tow point cylinder 164 remains in a constant position and material 118 is introduced in front of screed 106 thereby causing screed 106 to "ride up" over material 118 to some degree, depending on the angle of attack $\theta_A$, velocity of asphalt paver 100, consistency of material 118, temperature of material 118, weight of screed 106, among other factors. A silhouette of the scenario described in FIG. 2 is also illustrated for comparison, with the two scenarios aligned at tow point 112 for illustrative purposes. While tow point cylinder 164 remains constant, the introduction of material 118 in front of screed 106 causes the angle of attack $\theta_A$ to decrease.

If all conditions remain constant (velocity of asphalt paver 100, material 118, ground conditions, etc.), screed 106 will settle to a constant steady state angle of attack $\theta_A$. As asphalt paver 100 moves forward, trailing edge 120 begins to rise due to the increased pressure built up under screed 106. As trailing edge 120 slowly rises, the angle of attack $\theta_A$ reduces until a new steady state angle of attack $\theta_A$ is reached. In some embodiments, the steady state angle of attack $\theta_A$ will tend to remain relatively constant, such that a change in tow point height 122 will eventually (after a few tow arm lengths of travel distance) result in a corresponding change in mat thickness 124 (i.e., height of trailing edge 120) of the same or similar magnitude. A similar effect can be observed when tow point cylinder 164 is lowered—the resulting mat thickness 124 will eventually be reduced by the same or similar magnitude once screed 106 settles to a steady state after moving some distance forward.

Asphalt paver 100 is designed in such a way that in the absence of any tow point height control, the action of screed 106 will still result in a much smoother surface than the underlying terrain. The "smoothing" effect relies to a large degree on tow points 112 remaining at a constant height. By positioning tow points 112 at a midpoint between the wheels (or tracks) of tractor 102, the "rocking" effect of tractor 102 as it traverses small humps and hollows in the terrain is significantly reduced. However, if tractor 102 travels over humps or hollows that are larger than the track length, tow points 112 will rise and fall accordingly. In some instances, an automatic tow point height control system has been implemented to reduce vertical tow point movement due to uneven terrain.

Another issue that arises with operation of asphalt paver 100 is the difficulty in causing an actual cross slope $S_A$ of screed 106 to become aligned with a target cross slope $S_T$ set by a user or by an autopilot function of asphalt paver 100. Such difficulty arises for several reasons. First, because the angle of attack $\theta_A$ is dependent on the amount, temperature, and consistency of material 118, in addition to the positions of tow point cylinders 164, it is problematic to establish predetermined settings for tow point cylinders 164 that correspond to a particular actual cross slope $S_A$ of screed 106. Second, slope sensors that give a reliable indication of the actual cross slope $S_A$ are to be positioned directly on screed 106 or on a transverse beam extending between tow arms 110, which causes the slope sensors to be exposed to high temperatures and severe vibration effects. Third, knowledge of the actual cross slope $S_A$ is not necessarily helpful because movement of tow point cylinders 164 only has a time-delayed, indirect effect on the actual cross slope $S_A$. Systems and methods for controlling the actual cross slope $S_A$ of screed 106 while addressing the above-noted problems are described in reference to FIGS. 5-11.

Figure 5:
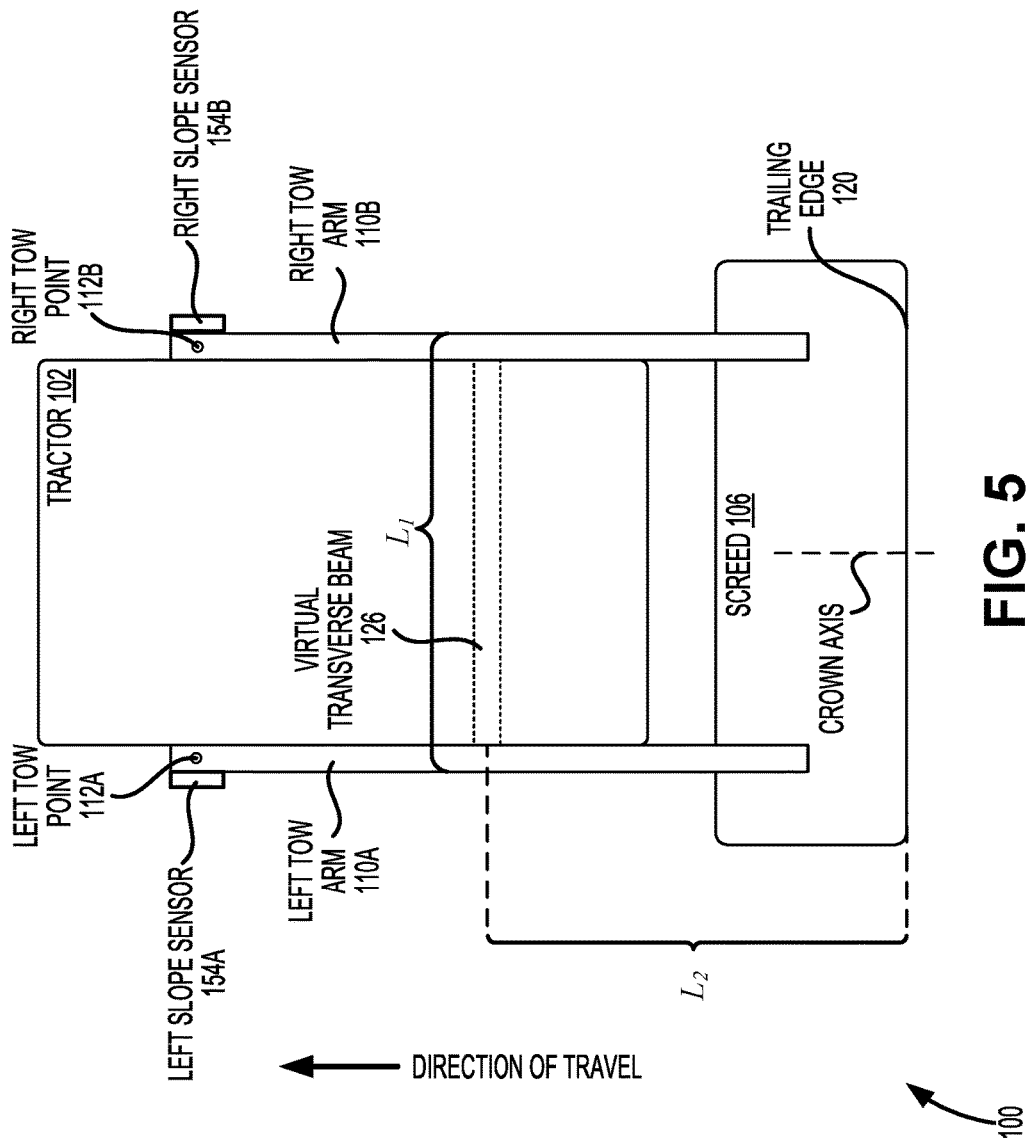
FIG. 5 illustrates a top view of an asphalt paver, according to some embodiments of the present invention.

FIG. 5 illustrates a top view of asphalt paver 100, according to some embodiments of the present invention. In the illustrated embodiment, asphalt paver 100 includes a left slope sensor 154A attached to a left tow arm 110A at a forward end of left tow arm 110A with respect to a direction of travel, and a right slope sensor 154B attached to a right tow arm 110B at a forward end of right tow arm 110B with respect to a direction of travel. In some embodiments, left slope sensor 154A may be attached to left tow arm 110A within 70%, 60%, 50%, 40%, 30%, 20%, 10%, 5%, or 1% of the forward end of left tow arm 110A, and right slope sensor 154B may be attached to right tow arm 110B within 70%, 60%, 50%, 40%, 30%, 20%, 10%, 5%, or 1% of the forward end of right tow arm 110B. Each of slope sensors 154 may be configured to measure a pitch angle with respect to a direction of travel and/or a roll angle with respect to a direction of travel. In some embodiments, each of slope sensors 154 may include a dual axis tilt sensor. In some embodiments, each of slope sensors 154 may include an inertial measurement unit (IMU).

In some embodiments, left tow arm 110A is connected to left tow point 112A at the forward end of left tow arm 110A and to screed 106 at the rear end of left tow arm 110A, and right tow arm 110B is connected to right tow point 112B at the forward end of right tow arm 110B and to screed 106 at the rear end of right tow arm 110B. In some embodiments, aside from being connected to tow points 112 and screed 106, tow arms 110 may lack any further connection such that no additional transverse beam exists between tow arms 110. In accordance with embodiments of the present invention, a virtual transverse beam 126 is established as extending between left tow arm 110A and right tow arm 110B. A length $L_1$ may be defined as the length of virtual transverse beam 126 and a length $L_2$ may be defined as the length from trailing edge 120 to a point at which a line extending vertically below virtual transverse beam 126 intersects with a line extending along the bottom side of screed 106 along a lateral edge (i.e., left or right lateral edge) of screed 106.

Figure 6:
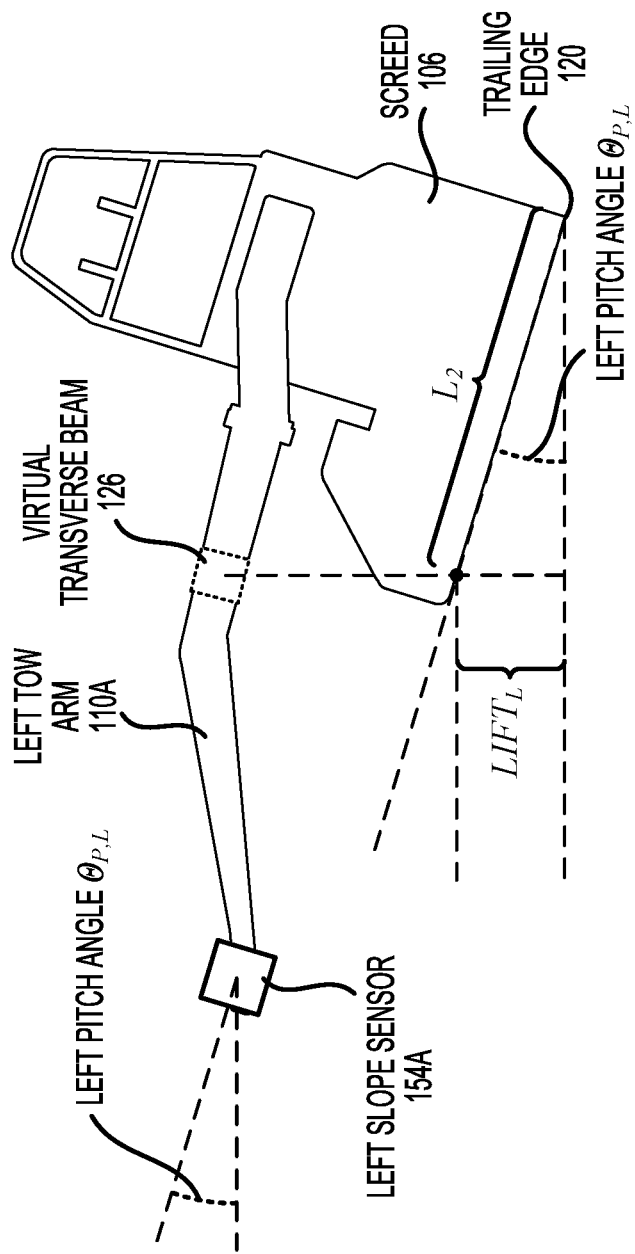
FIG. 6 illustrates a side view of an asphalt paver, according to some embodiments of the present invention.

FIG. 6 illustrates a side view of asphalt paver 100, according to some embodiments of the present invention. In the illustrated embodiment, left slope sensor 154A is configured to measure a left pitch angle $\theta_{P,L}$ with respect to a direction of travel. In some embodiments, left slope sensor 154A may be configured such that the left pitch angle $\theta_{P,L}$ corresponds to the angle formed by the ground and the bottom side of screed 106 along the left lateral edge of screed 106. In some embodiments, a left lift amount $\text{LIFT}_L$ is calculated using the equation:

$$\text{LIFT}_L = L_2 \times \sin(\theta_{P,L})$$

which may be used to calculate the lift-based component $S_L$ of the measured cross slope $S_M$.

Figure 7:
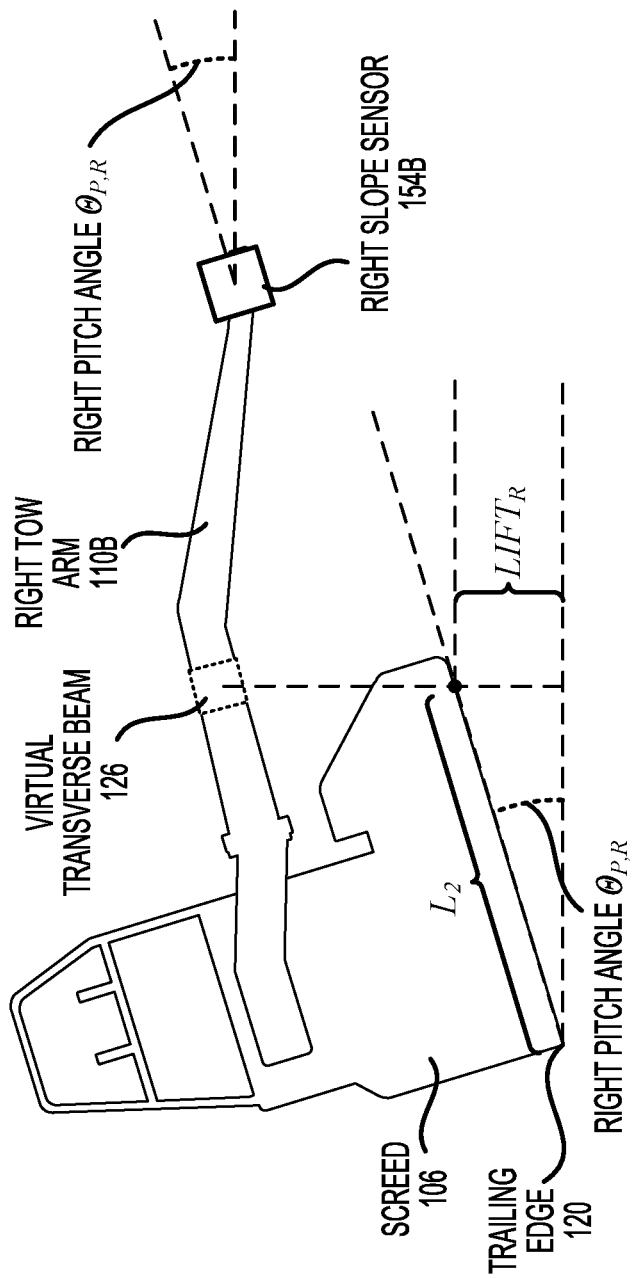
FIG. 7 illustrates a side view of an asphalt paver, according to some embodiments of the present invention.

FIG. 7 illustrates a side view of asphalt paver 100, according to some embodiments of the present invention. In the illustrated embodiment, right slope sensor 154B is configured to measure a right pitch angle $\theta_{P,R}$ with respect to a direction of travel. In some embodiments, right slope sensor 154B may be configured such that the right pitch angle $\theta_{P,R}$ corresponds to the angle formed by the ground and the bottom side of screed 106 along the right lateral edge of screed 106. In some embodiments, a right lift amount $\text{LIFT}_R$ is calculated using the equation:

$$\text{LIFT}_R = L_2 \times \sin(\theta_{P,R})$$

which may be used to calculate the lift-based component $S_L$ of the measured cross slope $S_M$. Using the left lift amount $\text{LIFT}_L$ and the right lift amount $\text{LIFT}_R$, the lift-based component $S_L$ of the measured cross slope $S_M$ may be calculated using the equation:

$$S_L = \arcsin\left(\frac{\text{LIFT}_L - \text{LIFT}_R}{L_1}\right)$$

which can be alternatively expressed as:

$$S_L = \arcsin\left(\frac{L_2 \times \sin(\theta_{P,L}) - L_2 \times \sin(\theta_{P,R})}{L_1}\right)$$

Figure 8:
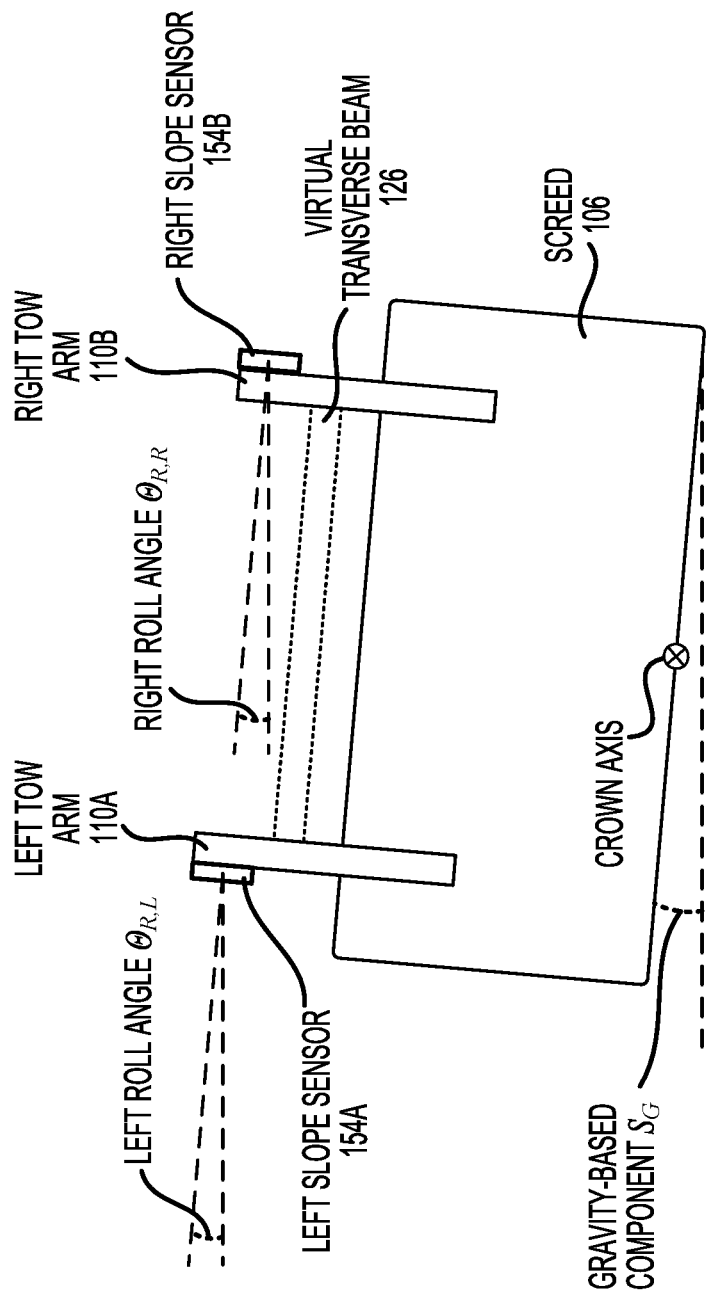
FIG. 8 illustrates a back view of an asphalt paver, according to some embodiments of the present invention.

FIG. 8 illustrates a back view of asphalt paver 100, according to some embodiments of the present invention. In the illustrated embodiment, left slope sensor 154A is configured to measure a left roll angle $\theta_{R,L}$ with respect to a direction of travel. In some embodiments, left slope sensor 154A may be configured such that the left roll angle $\theta_{R,L}$ corresponds to the angle formed by a line perpendicular to a direction of travel and a line perpendicular to left tow arm 110A. Similarly, in the illustrated embodiment, right slope sensor 154B is configured to measure a right roll angle $\theta_{R,R}$ with respect to a direction of travel. In some embodiments, right slope sensor 154B may be configured such that the right roll angle $\theta_{R,R}$ corresponds to the angle formed by a line perpendicular to a direction of travel and a line perpendicular to right tow arm 110B.

Using the left roll angle $\theta_{R,L}$ and the right roll angle $\theta_{R,R}$, the gravity-based component $S_G$ of the measured cross slope $S_M$ may be calculated using the equation:

$$S_G = \frac{\theta_{R,L} + \theta_{R,R}}{2}$$

In other words, the gravity-based component $S_G$ is equal to the average of the left roll angle $\theta_{R,L}$ and the right roll angle $\theta_{R,R}$. In some instances, the relationship between the left roll angle $\theta_{R,L}$ and the right roll angle $\theta_{R,R}$ is based on a crown axis extending along the bottom side of screed 106. If the crown angle is zero, the left roll angle $\theta_{R,L}$ and the right roll angle $\theta_{R,R}$ are equal. If the crown angle is non-zero, the left roll angle $\theta_{R,L}$ differs from the right roll angle $\theta_{R,R}$ and screed 106 is essentially "folded" through the crown axis. Using the gravity-based component $S_G$ and the lift-based component $S_L$ of the measured cross slope $S_M$, the measured cross slope $S_M$ can be calculated by summing the two, i.e., $$S_M = S_G + S_L$$

In this manner, the measured cross slope $S_M$ may correspond to the cross slope of virtual transverse beam 126.

Figure 9:
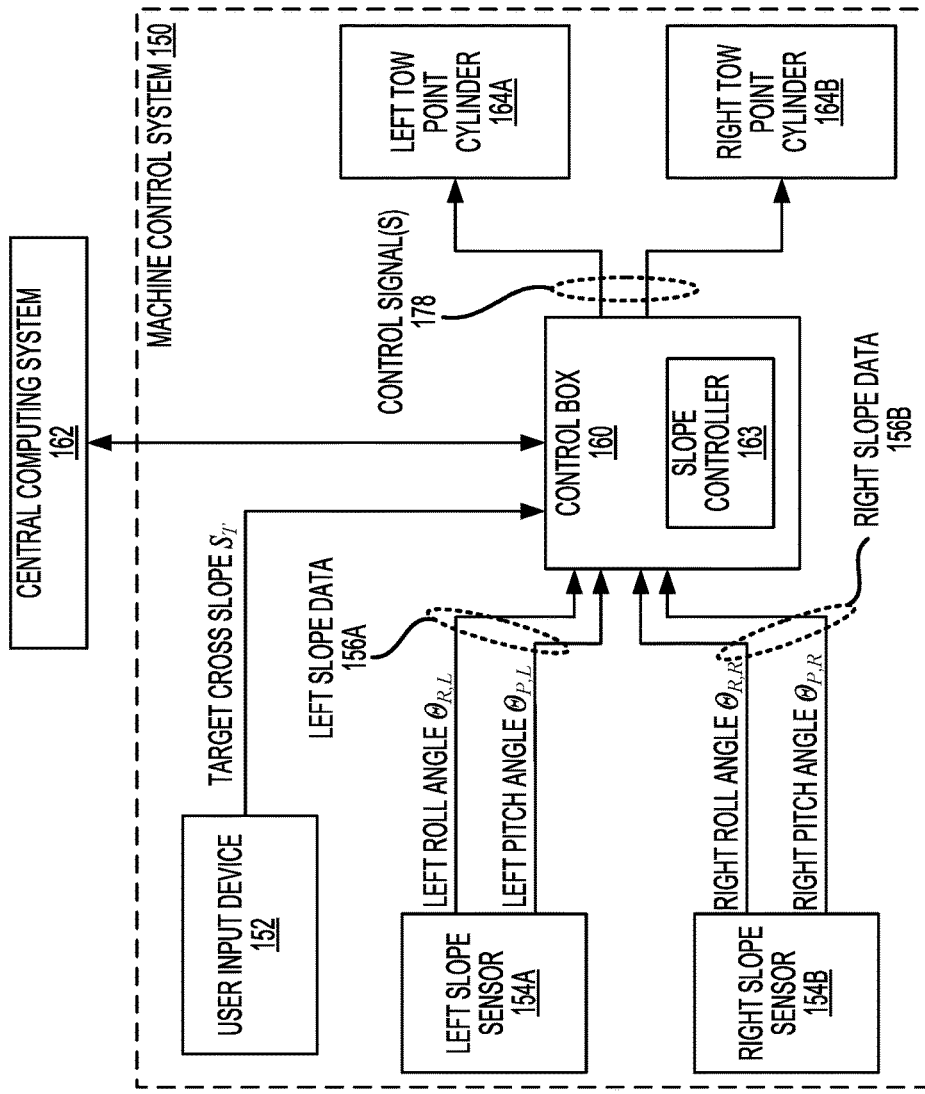
FIG. 9 illustrates a machine control system, according to some embodiments of the present invention.

FIG. 9 illustrates a machine control system 150, according to some embodiments of the present invention. Machine control system 150 includes various sensors, input devices, actuators, and processors for allowing one or more operators of asphalt paver 100 to complete a high-precision paving operation. The components of machine control system 150 may be mounted to or integrated with the components of asphalt paver 100 such that asphalt paver 100 may include machine control system 150. The components of machine control system 150 may be communicatively coupled to each other via one or more wired and/or wireless connections.

Machine control system 150 may include a control box 160 that receives data from the various sensors and inputs and generates commands that are sent to the various actuators and output devices. Control box 160 may include one or more processors and an associated memory. In some embodiments, control box 160 may be communicatively coupled to a central computing system 162 located external to machine control system 150 and asphalt paver 100. Central computing system 162 may send instructions to control box 160 of the details of a paving operation, such as an area to be paved, a desired asphalt thickness, a desired grading, etc. Central computing system 162 may also send alerts and other general information to control box 160, such as traffic conditions, weather conditions, the locations and status of material transfer vehicles, and the like.

In some embodiments, machine control system 150 includes a user input device 152 for receiving a target cross slope $S_T$ of screed 106 from a user and sending the target cross slope $S_T$ to control box 160. User input device 152 may be a keyboard, a touchscreen, a touchpad, a switch, a lever, a button, a steering wheel, an acceleration pedal, a brake pedal, and the like. User input device 152 may be mounted to tractor 102, hopper 104, screed 106, or any other physical part of asphalt paver 100. In one implementation, user input device 152 may be a computing device mounted vertically to an outer edge of screed extender 108, allowing an operator of asphalt paver 100 to walk alongside the construction machine during a paving operation. User input device 152 may further receive user inputs indicating a desired movement of tractor 102, a desired movement of screed 106, a desired width of screed 106, a desired mat thickness 124, and the like.

In some embodiments, machine control system 150 includes left slope sensor 154A configured to send left slope data 156A to control box 160 and right slope sensor 154B configured to send right slope data 156B to control box 160. Left slope data 154A may include the left roll angle $\theta_{R,L}$ and the left pitch angle $\theta_{P,L}$, and right slope data 154B may include the right roll angle $\theta_{R,R}$ and the right pitch angle $\theta_{P,R}$. In some embodiments, left slope data 154A directly includes the left roll angle $\theta_{R,L}$ and the left pitch angle $\theta_{P,L}$. In other embodiments, or in the same embodiments, left slope data 154A includes raw data that is processed by control box 160 to generate the left roll angle $\theta_{R,L}$ and the left pitch angle $\theta_{P,L}$ by, for example, integrating raw or filtered acceleration and/or angular rate measurements over a period of time. In some embodiments, right slope data 154B directly includes the right roll angle $\theta_{R,R}$ and the right pitch angle $\theta_{P,R}$. In other embodiments, or in the same embodiments, right slope data 154B includes raw data that is processed by control box 160 to generate the right roll angle $\theta_{R,R}$ and the right pitch angle $\theta_{P,R}$ by, for example, integrating raw or filtered acceleration and/or angular rate measurements over a period of time.

In some embodiments, control box 160 includes a slope controller 163 that calculates the measured cross slope $S_M$ using slope data 156, performs a comparison between the measured cross slope $S_M$ and the target cross slope $S_T$, and causes movement of tow point cylinders 164 based on the comparison by outputting one or more control signal(s) 178 to tow point cylinders 164. Control signal(s) 178 may include direct current (DC) or alternating current (AC) voltage signals, DC or AC current signals, and/or information-containing signals. Slope controller 163 may be a stand-alone hardware component or may be integrated with other hardware components within control box 160. The functionality of slope controller 163 is described in further detail in reference to FIG. 10.

Figure 10:
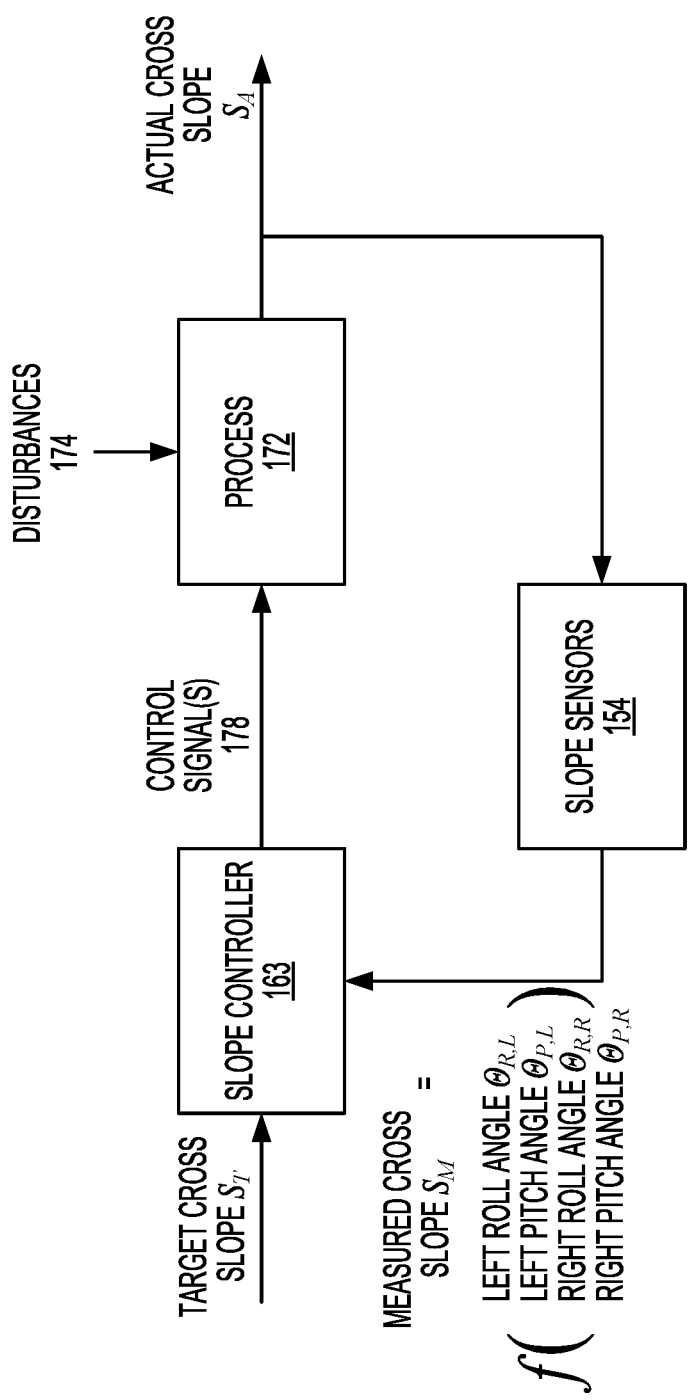
FIG. 10 illustrates a control process, according to some embodiments of the present invention.

FIG. 10 illustrates a control process 1000, according to some embodiments of the present invention. During a particular iteration of control process 1000, slope controller 163 receives the target cross slope $S_T$ of screed 106 and the measured cross slope $S_M$ of virtual transverse beam 126 or raw data used to calculate the measured cross slope $S_M$. In some embodiments, slope controller 163 calculates an error between the measured cross slope $S_M$ and the target cross slope $S_T$ by, for example, subtracting the two values. In some embodiments, slope controller 163 comprises a proportional-integral-derivative (PID) controller that generates control signal(s) 178 based on a first value equal to a first constant multiplied by the current error, a second value equal to a second constant multiplied by past values of the error, and/or a third value equal to a third constant multiplied by estimated future values of the error. For example, during a particular iteration of control process 1000, control signal(s) 178 may be generated by modifying control signal(s) 178 generated during the previous iteration based on the magnitude of the error such that larger errors cause larger modifications.

Slope controller 163 is configured to influence process 172 so as to minimize the calculated error between the measured cross slope $S_M$ and the target cross slope $S_T$. Because process 172 is influenced by disturbances 174 (changes in the temperature or consistency of material 118, irregularities in the underlying terrain, changes in the velocity of asphalt paver 100, etc.) and also because the measured cross slope $S_M$ of virtual transverse beam 126 has a time-delayed and/or indirect relationship with the actual cross slope $S_A$ of screed 106, convergence between the measured cross slope $S_M$, the target cross slope $S_T$, and the actual cross slope $S_A$ may require several iterations through control process 1000.

Figure 11:
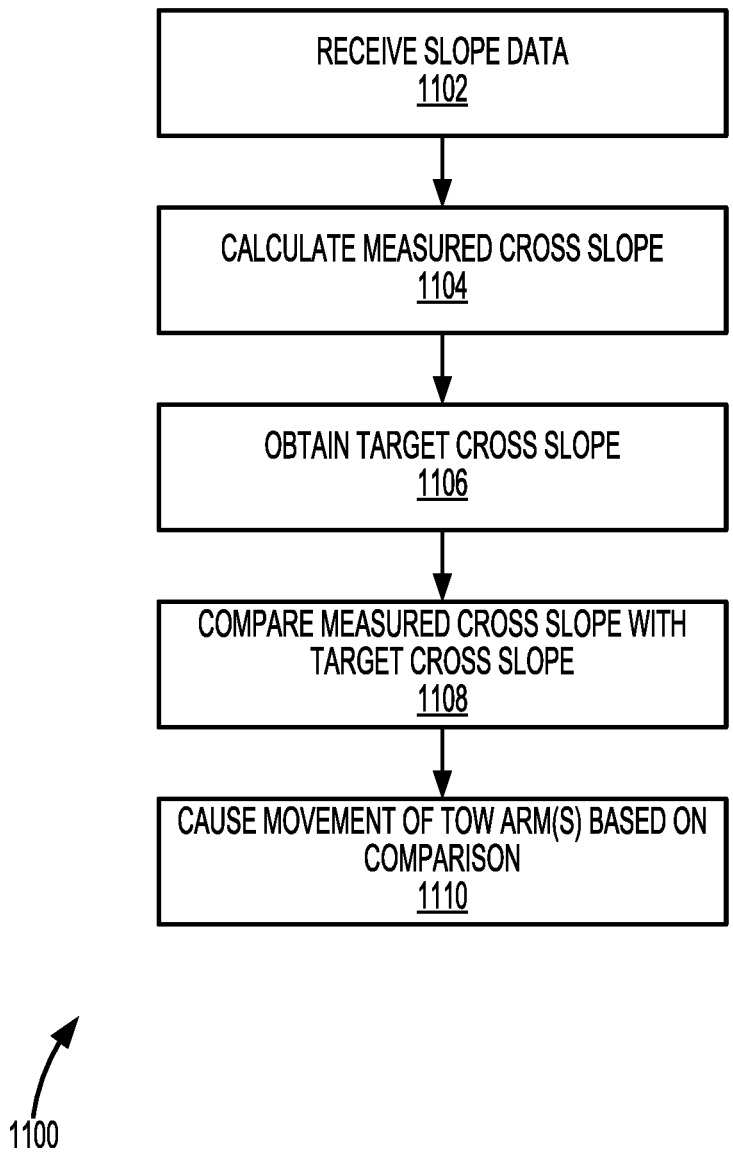
FIG. 11 illustrates a method for controlling a cross slope of a screed, according to some embodiments of the present invention.

FIG. 11 illustrates a method 1100 for controlling the actual cross slope $S_A$ of screed 106, according to some embodiments of the present invention. One or more steps of method 1100 may be performed in a different order than that shown in the illustrated embodiment, and one or more steps of method 1100 may be omitted during performance of method 1100.

At step 1102, slope data 156 is received by control box 160 from slope sensors 154. In some embodiments, left slope data 156A is received by control box 160 from left slope sensor 154A and right slope data 156B is received by control box 160 from right slope sensor 154B. In some embodiments, step 1102 may be preceded by left slope sensor 154A measuring left slope data 156A and right slope sensor 154B measuring right slope data 156B.

At step 1104, the measured cross slope $S_M$ of virtual transverse beam 126 is calculated based on slope data 156 by control box 160. In some embodiments, the measured cross slope $S_M$ is calculated based on both left slope data 156A and right slope data 156B. In some embodiments, the measured cross slope $S_M$ is calculated by summing the gravity-based component $S_G$ and the lift-based component $S_L$ of the measured cross slope $S_M$.

At step 1106, the target cross slope $S_T$ of screed 106 is obtained by control box 160. The target cross slope $S_T$ may be received from user input device 152 and/or central computing system 162, or may be generated within control box 160 by an autopilot function.

At step 1108, the measured cross slope $S_M$ is compared to the target cross slope $S_T$ by control box 160. In some embodiments, the comparison is performed by calculating an error between the measured cross slope $S_M$ and the target cross slope $S_T$.

At step 1110, one or both of left tow arm 110A and right tow arm 110B are caused to move by control box 160 based on the comparison performed in step 1108. In some embodiments, control box 160 may cause one or both of left tow arm 110A and right tow arm 110B to move by causing one or both of left tow point cylinder 164A and right tow point cylinder 164B to move. In some embodiments, control box 160 may cause one or both of left tow point cylinder 164A and right tow point cylinder 164B to move by generating and sending control signal(s) 178 to one or both of left tow point cylinder 164A and right tow point cylinder 164B. Control signal(s) 178 may include commands to open or close a proportional flow control valve by some percentage of full flow. For example, control signal(s) 178 may be digital (e.g., CAN bus messages) or analog (electrical current value) signals. In some embodiments, control signal(s) 178 may indicate incremental increases or decreases to the operational positions of tow point cylinders 164 (e.g., increase vertically by 5 mm) or may, in some embodiments, specify new operational positions (e.g., set tow point height 122 to 1 meter).

Figure 12:
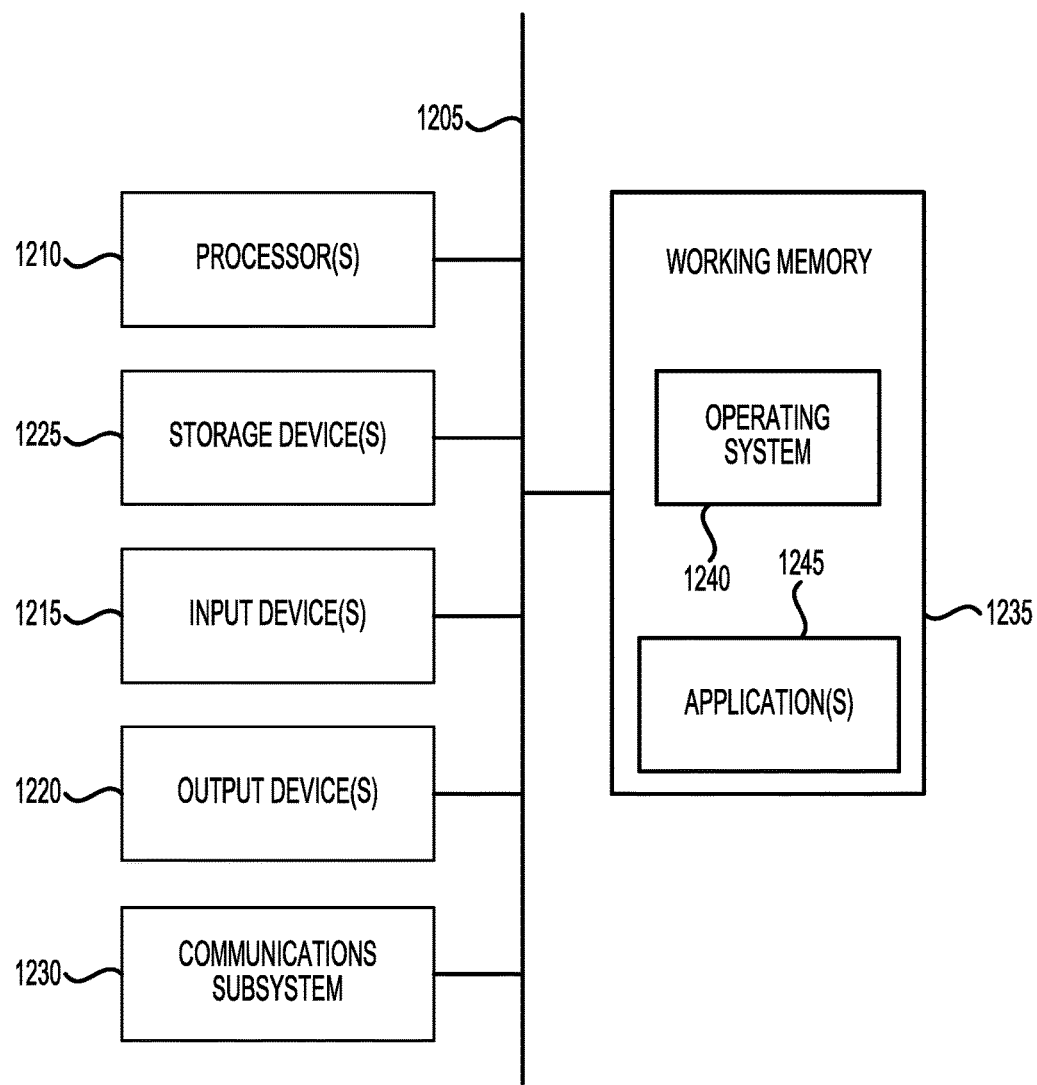
FIG. 12 illustrates a simplified computer system, according to some embodiments of the present invention.

FIG. 12 illustrates a simplified computer system 1200, according to some embodiments of the present invention. Computer system 1200 as illustrated in FIG. 12 may be incorporated into devices such as control box 160, central computing system 162, user input device 152, slope sensors 154, or some other device described herein. FIG. 12 provides a schematic illustration of one embodiment of computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or more integrated manner.

Computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include, without limitation a mouse, a keyboard, a camera, and/or the like; and one or more output devices 1220, which can include, without limitation a display device, a printer, and/or the like.

Computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1200 might also include a communications subsystem 1230, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1230 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1230. In other embodiments, a portable electronic device, e.g. the first electronic device, may be incorporated into computer system 1200, e.g., an electronic device as an input device 1215. In some embodiments, computer system 1200 will further comprise a working memory 1235, which can include a RAM or ROM device, as described above.

Computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1200 and/or might take the form of source and/or installable code, which, upon compilation and/or installation on computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1200 to perform methods in accordance with various embodiments of the technology. According to a set of embodiments, some or all of the procedures of such methods are performed by computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1200.

The communications subsystem 1230 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A construction machine comprising:
a tractor;
an implement coupled to the tractor via a left tow arm and a right tow arm;
a left slope sensor mounted to the left tow arm;
a right slope sensor mounted to the right tow arm; and
one or more processors configured to perform operations comprising:
receiving, from the left slope sensor, left slope data;
receiving, from the right slope sensor, right slope data;
calculating a measured cross slope of a virtual transverse beam extending between the left tow arm and the right tow arm based on the left slope data and the right slope data;
obtaining a target cross slope; and
causing movement of one or both of the left tow arm and the right tow arm based on a comparison between the measured cross slope and the target cross slope.

2. The construction machine of claim 1, wherein:
the construction machine is an asphalt paver; and
the implement is a screed.

3. The construction machine of claim 1, wherein the comparison between the measured cross slope and the target cross slope is performed by a slope controller that calculates an error between the measured cross slope and the target cross slope, and wherein causing movement of the one or both of the left tow arm and the right tow arm is based on the error.

4. The construction machine of claim 1, wherein:
the left slope data includes:
a left roll angle detected by the left slope sensor; and
a left pitch angle detected by the left slope sensor; and
the right slope data includes:
a right roll angle detected by the right slope sensor; and
a right pitch angle detected by the right slope sensor.

5. The construction machine of claim 4, wherein calculating a measured cross slope includes:
calculating a gravity-based component based on the left roll angle and the right roll angle;
calculating a lift-based component based on the left pitch angle and the right pitch angle; and
calculating the measured cross slope by summing the gravity-based component and the lift-based component.

6. The construction machine of claim 1, wherein causing movement of the one or both of the left tow arm and the right tow arm based on the comparison includes:
generating and sending a control signal to one or both of a left tow point cylinder coupled to the left tow arm and a right tow point cylinder coupled to the right tow arm.

7. The construction machine of claim 6, wherein:
the left tow arm is coupled to the left tow point cylinder at a forward end of the left tow arm and to the implement at a rear end of the left tow arm; and
the right tow arm is coupled to the right tow point cylinder at a forward end of the right tow arm and to the implement at a rear end of the right tow arm.

8. A machine control system comprising:
a left slope sensor mounted to a left tow arm of a construction machine, wherein the construction machine includes a tractor and an implement coupled to the tractor via the left tow arm and a right tow arm;
a right slope sensor mounted to the right tow arm; and
one or more processors configured to perform operations comprising:
  receiving, from the left slope sensor, left slope data;
  receiving, from the right slope sensor, right slope data;
  calculating a measured cross slope of a virtual transverse beam extending between the left tow arm and the right tow arm based on the left slope data and the right slope data;
  obtaining a target cross slope; and
  causing movement of one or both of the left tow arm and the right tow arm based on a comparison between the measured cross slope and the target cross slope.

9. The machine control system of claim 8, wherein:
the construction machine is an asphalt paver; and
the implement is a screed.

10. The machine control system of claim 8, wherein the comparison between the measured cross slope and the target cross slope is performed by a slope controller that calculates an error between the measured cross slope and the target cross slope, and wherein causing movement of the one or both of the left tow arm and the right tow arm is based on the error.

11. The machine control system of claim 8, wherein:
the left slope data includes:
  a left roll angle detected by the left slope sensor; and
  a left pitch angle detected by the left slope sensor; and
the right slope data includes:
  a right roll angle detected by the right slope sensor; and
  a right pitch angle detected by the right slope sensor.

12. The machine control system of claim 11, wherein calculating a measured cross slope includes:
calculating a gravity-based component based on the left roll angle and the right roll angle;
calculating a lift-based component based on the left pitch angle and the right pitch angle; and
calculating the measured cross slope by summing the gravity-based component and the lift-based component.

13. The machine control system of claim 8, wherein causing movement of the one or both of the left tow arm and the right tow arm based on the comparison includes:
generating and sending a control signal to one or both of a left tow point cylinder coupled to the left tow arm and a right tow point cylinder coupled to the right tow arm.

14. The machine control system of claim 13, wherein:
the left tow arm is coupled to the left tow point cylinder at a forward end of the left tow arm and to the implement at a rear end of the left tow arm; and
the right tow arm is coupled to the right tow point cylinder at a forward end of the right tow arm and to the implement at a rear end of the right tow arm.

15. A method comprising:
receiving left slope data from a left slope sensor, wherein the left slope sensor is mounted to a left tow arm of a construction machine, and wherein the construction machine includes a tractor and an implement coupled to the tractor via the left tow arm and a right tow arm;
receiving right slope data from a right slope sensor, wherein the right slope sensor is mounted to the right tow arm;
calculating a measured cross slope of a virtual transverse beam extending between the left tow arm and the right tow arm based on the left slope data and the right slope data;
obtaining a target cross slope; and
causing movement of one or both of the left tow arm and the right tow arm based on a comparison between the measured cross slope and the target cross slope.

16. The method of claim 15, wherein:
the construction machine is an asphalt paver; and
the implement is a screed.

17. The method of claim 15, wherein the comparison between the measured cross slope and the target cross slope is performed by a slope controller that calculates an error between the measured cross slope and the target cross slope, and wherein causing movement of the one or both of the left tow arm and the right tow arm is based on the error.

18. The method of claim 15, wherein:
the left slope data includes:
  a left roll angle detected by the left slope sensor; and
  a left pitch angle detected by the left slope sensor; and
the right slope data includes:
  a right roll angle detected by the right slope sensor; and
  a right pitch angle detected by the right slope sensor.

19. The method of claim 18, wherein calculating a measured cross slope includes:
calculating a gravity-based component based on the left roll angle and the right roll angle;
calculating a lift-based component based on the left pitch angle and the right pitch angle; and
calculating the measured cross slope by summing the gravity-based component and the lift-based component.

20. The method of claim 15, wherein causing movement of the one or both of the left tow arm and the right tow arm based on the comparison includes:
generating and sending a control signal to one or both of a left tow point cylinder coupled to the left tow arm and a right tow point cylinder coupled to the right tow arm.

* * * * *